April 19, 1955 D. RINGO ET AL 2,706,532
FLUID TREATING APPARATUS
Filed March 26, 1953 9 Sheets-Sheet 1

FIG. I.

INVENTORS
DAN RINGO
ERNEST B. MILLER
STONE E. BUSH
BY
*Adams + Bush*
ATTORNEYS

INVENTORS
DAN RINGO
ERNEST B. MILLER
STONE E. BUSH

April 19, 1955  D. RINGO ET AL  2,706,532
FLUID TREATING APPARATUS
Filed March 26, 1953  9 Sheets-Sheet 3

INVENTORS
DAN RINGO
BY ERNEST B. MILLER
STONE E. BUSH

Adams + Bush
ATTORNEYS

April 19, 1955   D. RINGO ET AL   2,706,532
FLUID TREATING APPARATUS
Filed March 26, 1953   9 Sheets-Sheet 4

INVENTORS
DAN RINGO
ERNEST B. MILLER
STONE E. BUSH

BY

*Adams+Bush*
ATTORNEYS

April 19, 1955  D. RINGO ET AL  2,706,532
FLUID TREATING APPARATUS
Filed March 26, 1953  9 Sheets-Sheet 5

INVENTORS
DAN RINGO
ERNEST B. MILLER
STONE E. BUSH
BY
Adams+Bush
ATTORNEYS

April 19, 1955 D. RINGO ET AL 2,706,532
FLUID TREATING APPARATUS
Filed March 26, 1953 9 Sheets-Sheet 6

INVENTORS
DAN RINGO
ERNEST B. MILLER
STONE E. BUSH
BY
Adams+Bush
ATTORNEYS

April 19, 1955 D. RINGO ET AL 2,706,532
FLUID TREATING APPARATUS
Filed March 26, 1953 9 Sheets-Sheet 7

INVENTORS
DAN RINGO
ERNEST B. MILLER
STONE E. BUSH

BY
*Adams+Bush*
ATTORNEYS

April 19, 1955

D. RINGO ET AL 2,706,532

FLUID TREATING APPARATUS

Filed March 26, 1953

INVENTORS
DAN RINGO
ERNEST B. MILLER
STONE E. BUSH

BY Adams + Bush

ATTORNEYS

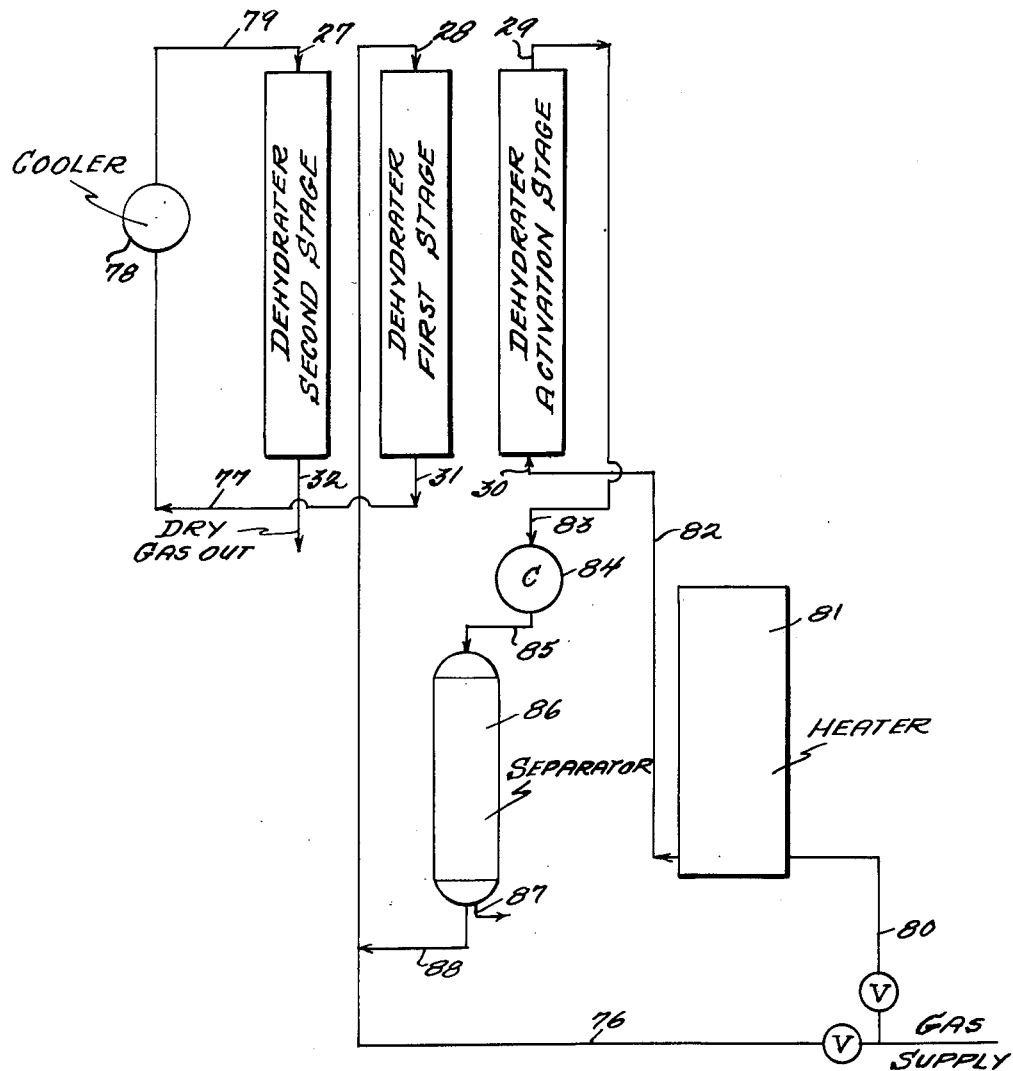

United States Patent Office 2,706,532
Patented Apr. 19, 1955

2,706,532

FLUID TREATING APPARATUS

Dan Ringo and Ernest B. Miller, Houston, Tex., and Stone E. Bush, Washington, D. C., assignors to Adsorption Research Corporation, Houston, Tex., a corporation of Texas Application March 26, 1953, Serial No. 344,766

12 Claims. (Cl. 183—4.7)

This invention relates to fluid treating apparatus of the type in which fluids, either liquid or gaseous, are brought into contact with the treating material, either a reactant material to effect a chemical reaction, and/or an adsorbent material to adsorb liquid or gaseous products from the fluid being treated, and in which the treating material is stripped of its adsorbed products and/or is regenerated for further use. The present invention has more particular reference to fluid treating apparatus of the so-called continuous type.

One object of the present invention is to provide a novel and improved fluid treating apparatus providing for a plurality of separate, distinct and continuous flows of fluid therethrough and in which a plurality of closed vessels containing fluid treating material have one of their ends in communication with the upper end of a distribution chamber and their other ends in communication with the bottom end of the distribution chamber; a rotatable disc valve mounted in the distribution chamber; and means for rotating the disc valve so that the flows of fluids through the apparatus will be directed successively through each of the vessels containing fluid treating material.

Another object of the invention is to provide fluid treating apparatus, as characterized above, in which a large surface area of relatively thin beds of fluid treating material offering a minimum of resistance to the flow of the fluids is condensed into a small cubic space.

Another object of the invention is to provide fluid treating apparatus, as characterized above, in which baffle members are provided to insure an even flow of the fluid through the treating material, thereby making effective use of all of the treating material and increasing the efficiency and capacity of the apparatus.

Another object of the invention is to provide fluid treating apparatus, as characterized above, in which the vessels containing the fluid treating material have readily accessible and removable cover plates through which the fluid treating material may be readily removed and replaced.

A further and more specific object of the present invention is to provide an improved apparatus for removing moisture and condensable hydrocarbons from natural gas.

Other objects and advantages of the invention will appear in the specification when considered in connection with the accompanying drawings, in which:

Fig. 19 is a schematic view showing the course of the fluid being treated through the first and second dehydration zones of the apparatus and the flow of regenerating fluid through the activation zone of the apparatus.

Figure 1:
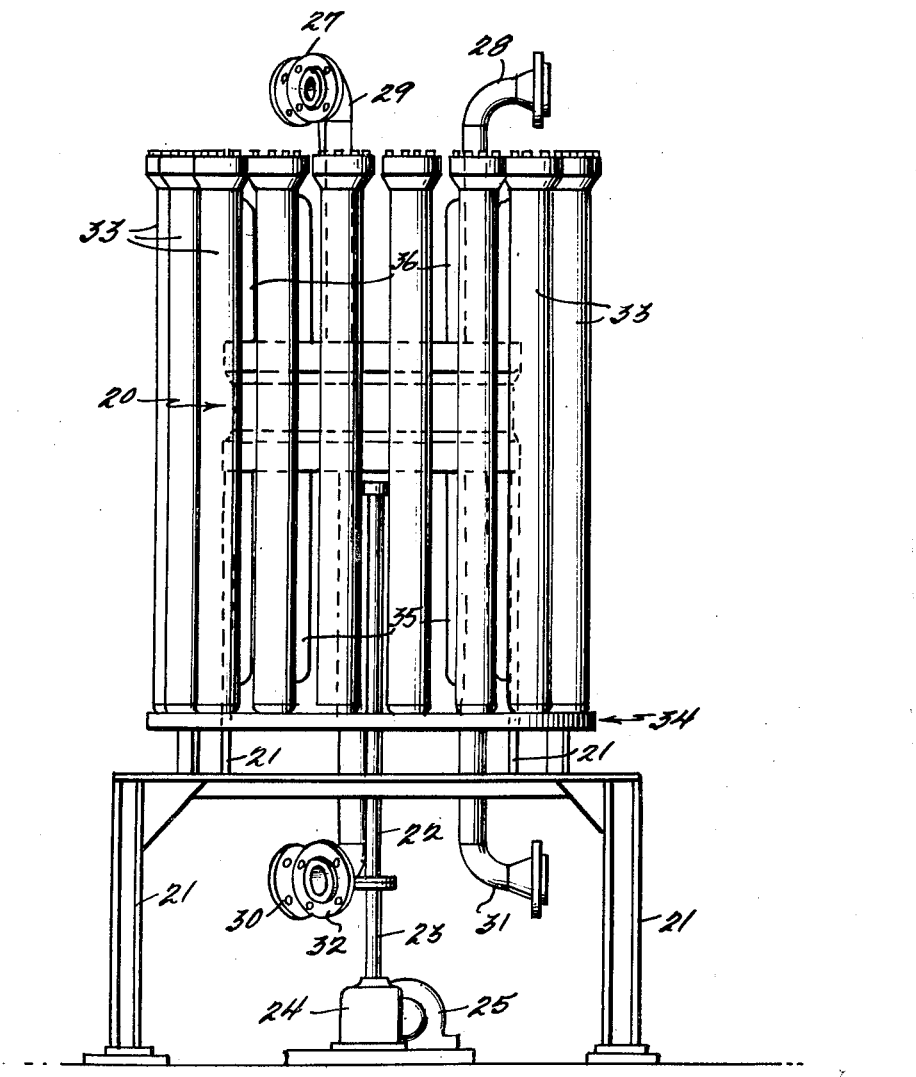
Fig. 1 is a side elevational view of one embodiment of fluid treating apparatus constructed in accordance with the present invention.

The present invention is an improvement over the apparatus shown in co-pending application, Ser. No. 315,309, for Fluid Treating Apparatus, filed October 17, 1952, by Dan Ringo et al.

In general, the present invention comprises an upright cylindrical distribution chamber having a rotatable double-faced disc valve mounted therein; a plurality of inlet conduits for the fluid being treated connected to the top of the distribution chamber; a plurality of outlet conduits connected to the bottom of the distribution chamber; a plurality of upright cylindrical pressure vessels, each adapted to hold fluid treating material and having an inlet pipe connecting its upper end portion to the upper end of the distribution chamber and an outlet pipe connecting its bottom portion to the lower end of the distribution chamber; and means for rotating the valve in the distribution chamber, whereby each of the fluids admitted to the distribution chamber through the inlet conduits connected thereto will flow through successive groups of the pressure vessels containing the fluid treating material and from there back to the distribution chamber and out through the outlet conduits connected to the distribution chamber.

While the apparatus of the present invention may be employed for treating fluids, either liquid or gaseous, for various purposes, it will be described, by way of illustration, as used to remove moisture and condensable hydrocarbons from natural gas.

Referring now to Figs. 1 to 12, inclusive, there is shown one embodiment of fluid treating apparatus constructed in accordance with the present invention. As there shown, the apparatus comprises an upright cylindrical pressure distribution chamber 20 supported by suitable framework, indicated at 21; a rotatable vertical shaft 22 extending into the distribution chamber 20 and journaled and supported by a suitable radial bearing mounted in the upper closure disc of the distribution chamber, with its lower end extending through a suitable shaft seal secured to the bottom closure disc of the distribution chamber; a vertical shaft 23 coupled to the bottom of the shaft 22 and connected to a suitable differential gearing, indicated at 24, driven by a motor 25; a double-faced rotatable disc valve 26 mounted within the distribution chamber 20 and fixedly secured on the shaft 22 for rotation therewith; a plurality of fluid inlet conduits, three being shown, 27, 28, 29, connected to the top of the distribution chamber for admitting fluids thereto; a plurality of fluid outlet conduits, three being shown, 30, 31, 32, connected to the bottom of the distribution chamber 20 for exhausting fluids therefrom; and a plurality of fluid treating cylindrical pressure vessels 33 supported in a raised upright position encircling the distribution chamber 20, by a suitable framework, indicated generally at 34, with each of the vessels 33 having an inlet pipe 35 connecting its lower end portion to the bottom of the distribution chamber 20 and an outlet pipe 36 connecting its upper end portion to the top of the distribution chamber 20.

Figure 4:
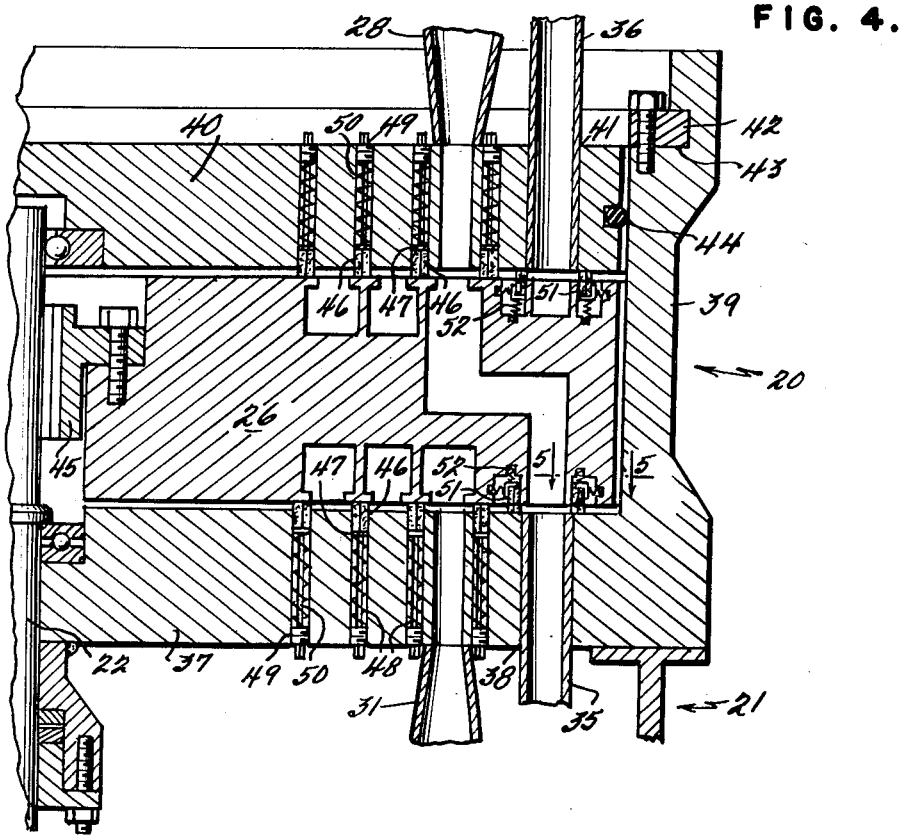
Fig. 4 is a fragmentary vertical cross sectional view of the pressure distribution chamber, showing the manner in which the disc valve is mounted therein and the manner in which the seals and packing ring are mounted.

The distribution chamber 20, as best shown in Figs. 1 and 4, comprises a lower or bottom tube sheet end closure disc 37 having a plurality of circular openings 38 extending therethrough, the openings being spaced from each other and formed in a circular row spaced inwardly from the periphery of the disc and with three circumferentially and radially spaced outlet openings, which, for the purpose of clarity of description, are designated $a'$, $b'$ and $c'$, respectively; a cylindrical collar 39 which forms the side wall of the chamber and which may be formed integral with the bottom tube sheet disc 37, as shown, or welded thereto; an upper or top tube sheet end closure disc 40 having a plurality of circular openings 41 extending therethrough and positioned to correspond and be in vertical alignment with the openings 38 in the bottom of the tube sheet disc 37, and with three circumferentially and radially spaced inlet openings, which, for the purpose of clarity of description, are designated $a$, $b$, and $c$, respectively; a split shear ring 42 bolted to the tube sheet disc 40 and fitted into a circumferential recess 43 formed in the inner surface of the collar 39 for holding the upper tube sheet disc in place, and an O-ring packing member 44 mounted between the upper tube sheet disc 40 and the collar 39 to insure gas-tightness of the chamber.

The three inlet conduits 27, 28 and 29 are secured to the top tube sheet disc 40, as by welding, for communication with the interior of the chamber through openings $a$, $b$, and $c$, respectively. The three outlet conduits 30, 31 and 32 are secured to the bottom tube sheet disc 37, as by welding, for communication with the interior of the chamber through openings $a'$, $b'$ and $c'$, respectively.

The outer ends of the inlet pipes 35 which connect the pressure vessels 33 to the bottom of the distribution chamber 20, are fitted into the openings 38 formed in the bottom tube sheet disc 37. The outer ends of the outlet pipes 36 which connect the pressure vessels 33 to the top of the distribution chamber 20 are fitted into the openings 41 formed in the upper tube sheet disc 40.

The double-faced disc valve 26 is mounted within the distribution chamber 20 between the upper and lower tubesheet discs and is fixedly connected to the shaft 22 for rotation therewith, as by means of a splined collar 45 mounted on the shaft and bolted to the disc valve.

One embodiment of a disc valve is shown in Figs. 4 to 12 inclusive. As there shown, the upper face of the disc valve (Fig. 7) has a plurality of radially spaced concentric channels formed therein, three such channels being shown, and, for the purpose of clarity of description, designated fluid annulus $a$, $b$ and $c$, respectively. In the particular embodiment illustrated, the outer channel $a$ and the inner channel $c$ are separated from the intermediate channel $b$ by walls which are T-shaped in cross section. The upper face of the valve also has a plurality of circumferentially spaced arc-shaped channels formed therein, three such channels being shown, and for the purpose of clarity of description, designated manifolds $a$, $b$ and $c$, respectively. The arc-shaped channels $a$, $b$ and $c$ are spaced inwardly from the outer periphery of the disc valve and are of the same length and have equal radii. The bottom face of the disc valve (see Fig. 12) has a plurality of radially spaced concentric channels formed therein, three such being shown, and, for the purpose of clarity of description, designated fluid annulus $a'$, $b'$ and $c'$, respectively. In the particular embodiment illustrated, the outer channel $a'$ and the inner channel $c'$ are separated from the intermediate channel $b'$ by walls which are T-shaped in cross section. The bottom face of the valve also has a plurality of circumferentially spaced arc-shaped channels formed therein, three such channels being shown, and, for the purpose of clarity of description, designated manifolds $a'$, $b'$ and $c'$, respectively.

Figure 9:
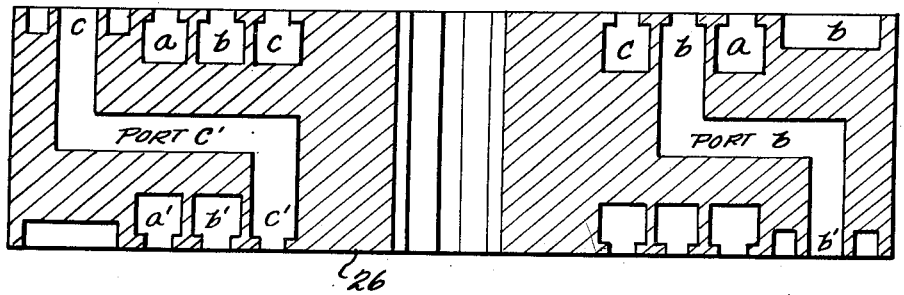
Fig. 9 is a vertical cross sectional view, taken on the line 9—9 of Fig. 7, looking in the direction of the arrows.
Figure 10:
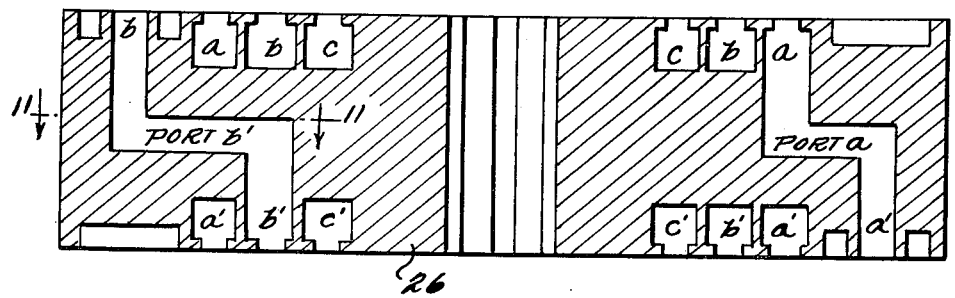
Fig. 10 is a vertical cross sectional view taken on the line 10—10 of Fig. 7, looking in the direction of the arrows.
Figure 11:
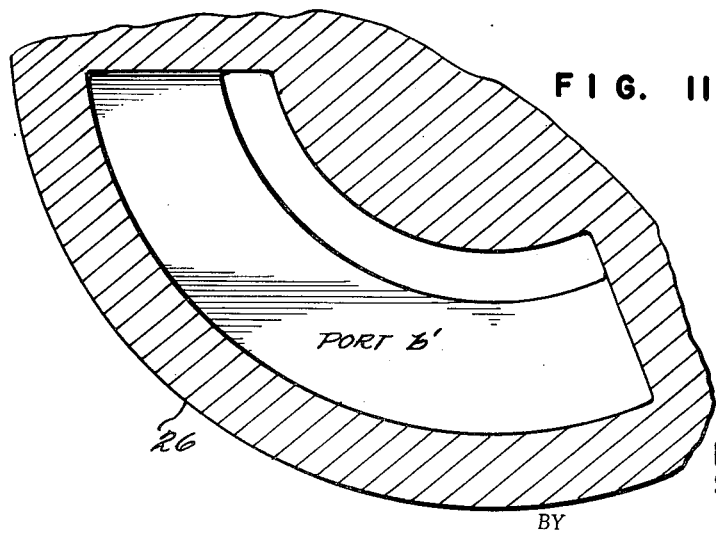
Fig. 11 is a fragmentary longitudinal sectional view, taken on the line 11—11 of Fig. 10.
Figure 12:
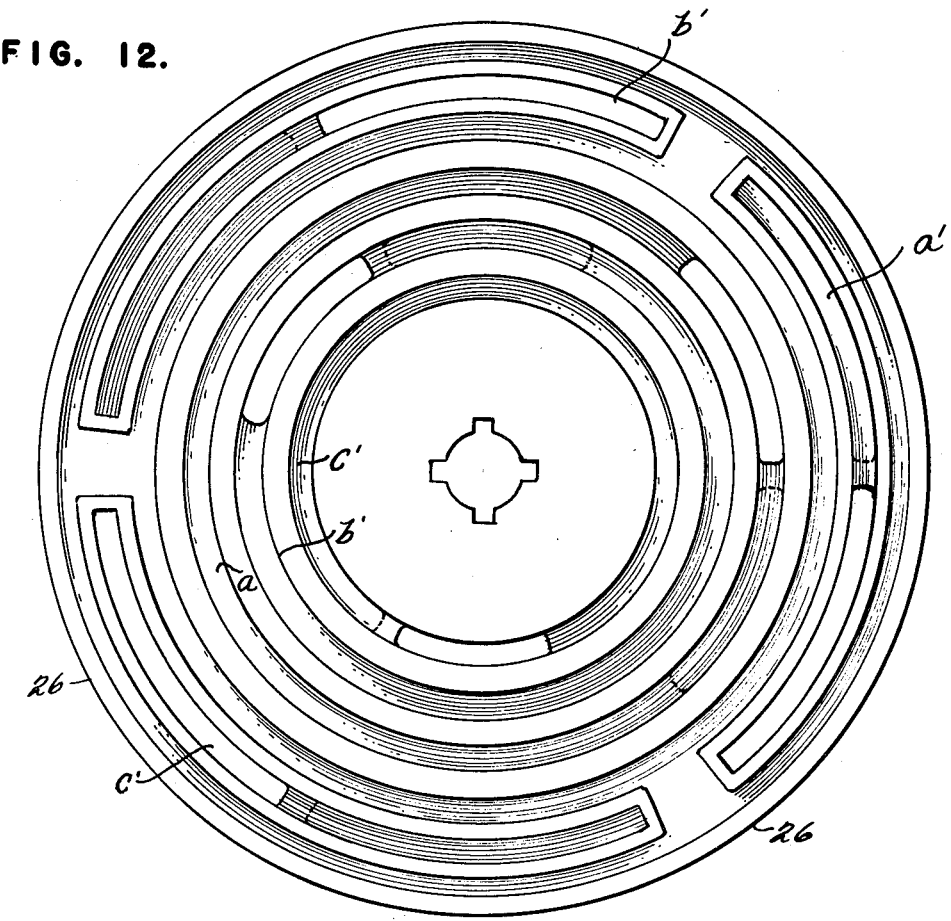
Fig. 12 is a plan view of the bottom face of the disc valve shown in Fig. 7.

A plurality of circumferentially spaced passageways are formed in the disc valve, six such passageways being shown, and, for the purpose of clarity of description, designated ports $a$, $a'$, $b$, $b'$, $c$ and $c'$, respectively. The port $a$ provides communication between a portion of the bottom of the annulus $a$ formed in the upper face of the valve and the manifold $a'$ formed in the bottom face of the valve (see Fig. 10); the port $a'$ provides communication between a portion of the bottom of the annulus $a'$ formed in the bottom face of the valve and the manifold $a$ formed in the upper face of the valve (Fig. 8); the port $b$ provides communication between a portion of the bottom of the annulus $b$ formed in the upper face of the valve and the manifold $b'$ formed in the bottom face of the valve (Fig. 9); the port $b'$ provides communication between a portion of the bottom of the annulus $b'$ formed in the bottom face of the valve and the manifold $b$ formed in the upper face of the valve (Fig. 10); the port $c$ provides communication between a portion of the bottom of the annulus $c$ formed in the upper face of the valve and manifold $c'$ formed in the bottom face of the valve (Fig. 8); and the port $c'$ provides communication between a portion of the bottom of the annulus $c'$ formed in the bottom surface of the valve and the manifold $c$ formed in the upper surface of the valve (Fig. 9).

The disc valve 26 is mounted within the distribution chamber with its upper face or surface spaced slightly from the top tube sheet disc 40, and its lower or bottom face spaced slightly from the lower or bottom tube sheet disc 37.

Figure 5:
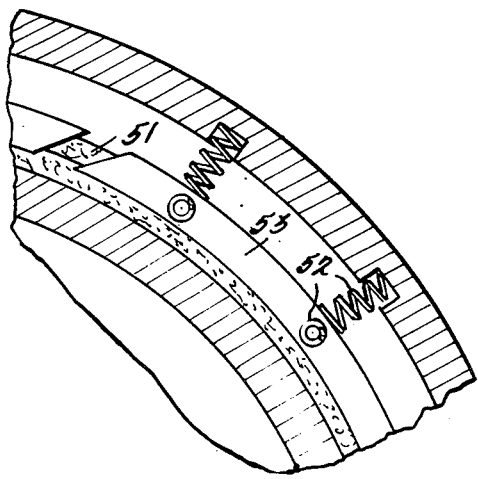
Fig. 5 is a fragmentary horizontal cross sectional view taken on the line 5—5 of Fig. 5.
Figure 6:
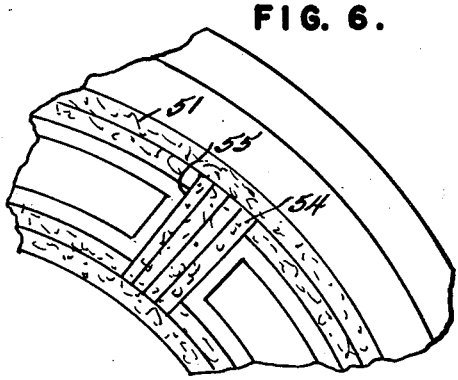
Fig. 6 is a fragmentary detail view showing the manner in which the packing is mounted in a cross seal.
Figure 7:
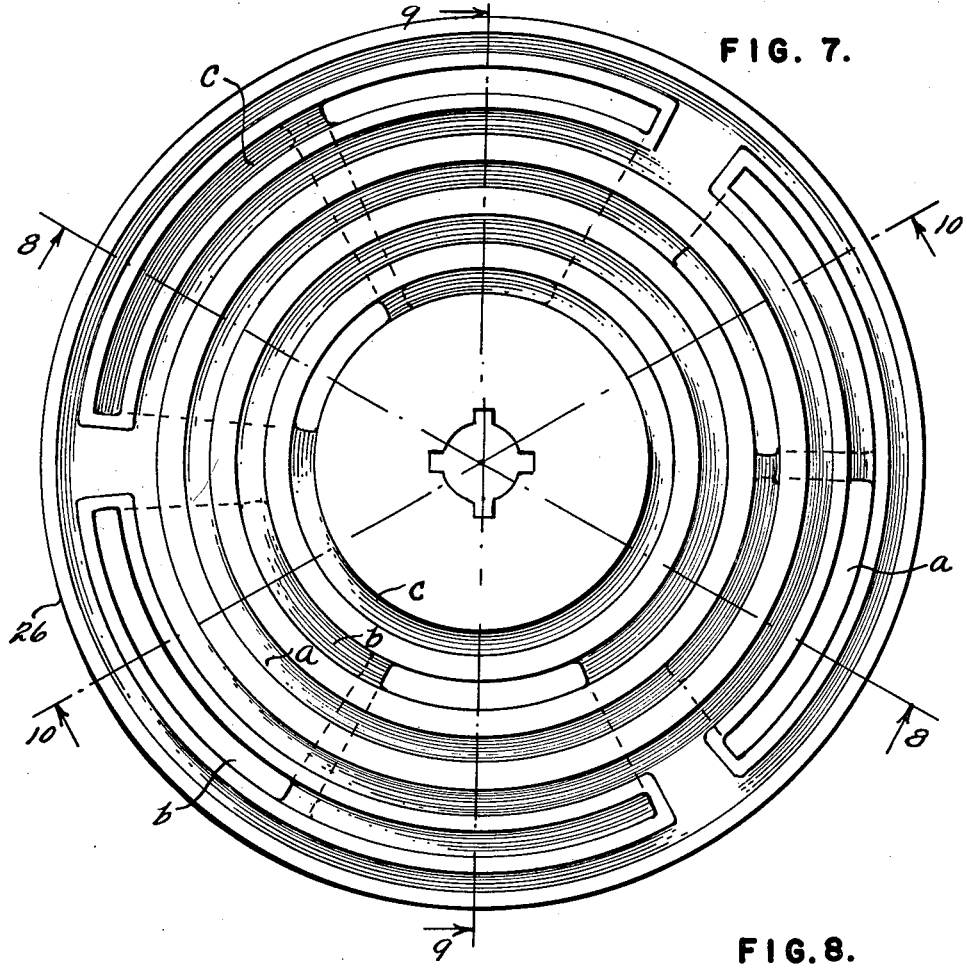
Fig. 7 is a plan view of the upper surface of the disc valve shown in Fig. 4, with the packing rings omitted.
Figure 8:
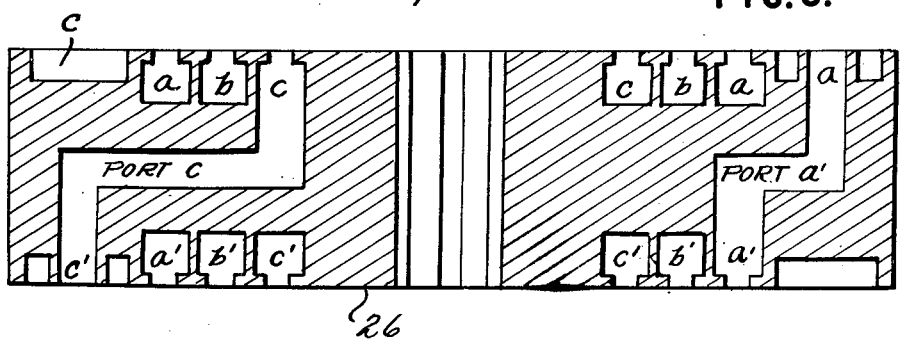
Fig. 8 is a vertical cross sectional view, taken on the line 8—8 of Fig. 7, looking in the direction of the arrows.

The manner in which the annular channels $a$, $a'$, $b$, $b'$, $c$ and $c'$ and the manifolds $a$, $a'$, $b$, $b'$ $c$ and $c'$ are sealed off from the space within the distribution chamber is shown in Figs. 4, 5 and 6. As there shown, the open tops (or bottoms) of the annular channels $a$, $a'$, $b$, $b'$, $c$ and $c'$ in the valve disc 26 are sealed off from the space between the tube sheets and the surfaces of the valve discs by means of annular seals 46, each seated in an annular recess formed in the inner surface of the tube sheets with their free lower (or upper) ends pressed into engagement with the surface of the valve disc by means of split, flat, annular metal strips 47 resting on the upper (or lower) ends of the seals and pressed downwardly (or upwardly) thereon, as by means of a plurality of coiled springs 48 mounted in circumferentially spaced vertical openings extending through the tube sheets with an adjusting and pressure sealing plug 49 threaded in each opening for adjusting the pressure of the springs. Each of the adjusting nuts may be provided with a stem 50 extending through the spring to hold it in upright position. Each of the seals 46, preferably and as shown, comprises a plurality of annular strips of packing generally rectangular in cross section and made of any suitable material, such as teflon or silica impregnated asbestos.

The open tops (or bottoms) of the manifolds $a$, $a'$, $b$, $b'$, $c$ and $c'$ formed in the disc valve 26 are sealed off from the space between the tube sheet discs and the surfaces of the valve disc by means of annular seals 51, each seated in an annular recess formed in the upper (or lower) surface of the valve 26, with their free ends pressed into sealing engagement with the surface of the tube sheer.

Each of the annular seals 51 is pressed into engagement with the inner surface of the tube sheet and the side wall of the recess in which the seal is mounted, adjacent the manifold, as by means of a plurality of circumferentially spaced coiled springs 52 fitted into circular recesses formed in the bottom (or top) and a side wall of the recess and engaging the legs of a slit, annular retaining ring 53, made of angle iron (see Fig. 4). Each of the seals 51, preferably and as shown, comprises a plurality of annular strips of packing, generally rectangular in cross section and made of any suitable material, such as teflon or silica impregnated asbestos.

Obviously, any leakage of fluids past the seals 46 and 51 into the distribution chamber 20, serves to equalize the pressure on both sides of the seals and increases their sealing efficiency. The O-ring packing 44 and the shaft seal serve to prevent leakage from the distribution chamber 20.

The three manifolds $a$, $b$ and $c$ on the upper surface of the valve disc and the three manifolds $a'$, $b'$ and $c'$ on the bottom surface of the valve disc are sealed off from each other by means of cross seals 54, each seated in a radially extending recess 55 formed in the surface of the disc valve between the adjacent end walls of the manifolds and opening into the adjacent annular recess in which the annular seals 51 are seated. Each cross seal is tightly wedged in its recess with its ends in sealing engagement with the adjacent side walls of the annular seals 51 and with its bottom (or upper) surface pressed into tight sealing engagement with the inner surface of the adjacent tube sheet (see Figs. 4, 5 and 6).

The widths of the manifolds $a$, $a'$, $b$, $b'$, $c$ and $c'$ are substantially the same as the internal diameters of the circular openings 38 and 41 formed in the tube sheets and each of the cross seals 54 is of a width greater than the diameter of these circular openings, so that each cross seal can effectively seal off one of the openings.

When the rotary disc valve 26 is stationary, with each of the cross seals 54 sealing off one of the circular openings 38 or 41 formed in the valve, the foregoing arrangement, in effect, divides the pressure vessels into three groups, with one group connected to communicate with the manifolds a, a', one group connected to communicate with the manifolds b, b', and one group connected to communicate with the manifolds c, c', so that three separate, distinct and continuous flows of fluid may pass through the apparatus. Each flow entering the distribution chamber 20 by means of one of the inlet conduits 27, 28 or 29, thence through one of the group of pressure vessels 33, back into the distribution chamber 20 and out through one of the outlet conduits 30, 31 or 32. As the disc valve 26 rotates, each of the flows of fluid will successively pass through the three groups of pressure vessels 33.

Figure 16:
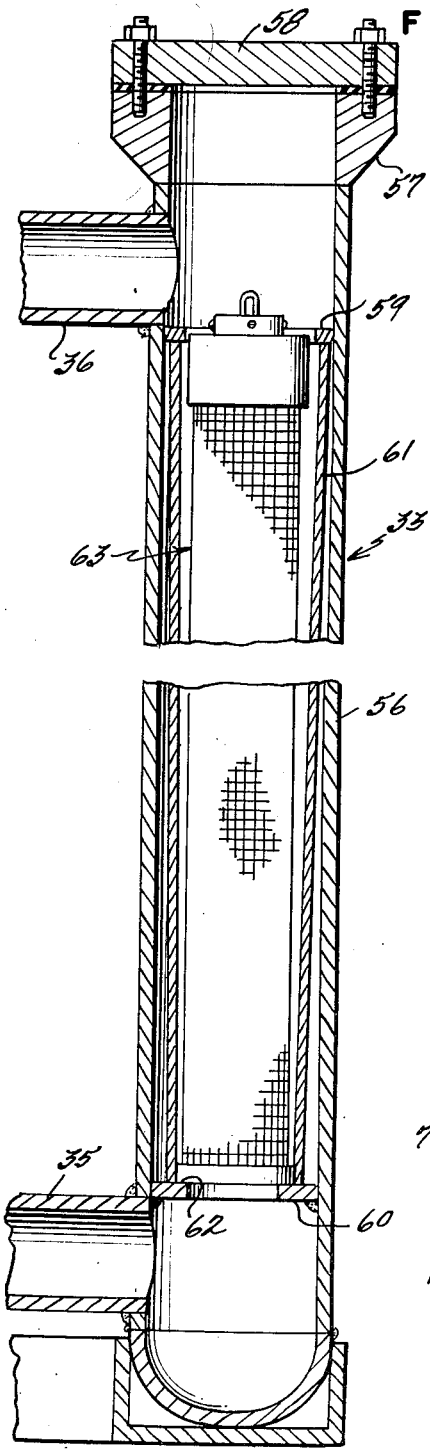
Fig. 16 is a vertical sectional view of one of the pressure vessels having a fluid treating material container mounted therein.

The fluid treating material containing pressure vessels 33 are identical in construction and, as shown in Fig. 16, each comprises an elongated, hollow, cylindrical member 56 having a closed rounded bottom end and an open upper end provided with an integral flange 57, to which is secured, as by bolting, a removable cover plate 58.

Horizontally disposed and vertically spaced annular discs 59, 60 are mounted in the upper and lower end portions, respectively, of the member 56 and secured therein, as by welding, to form a gas-tight joint between the outer peripheral edges of the discs and the side walls of the member 56. The diameter of the openings in the upper disc 59 is greater than the diameter of the opening in the lower disc 60 and a generally frusto-conically shaped, hollow baffle member 61 extends between the discs 59 and 60 with its top end fitted in the opening in the upper disc 59 and its lower end secured to the disc 60, as by welding, along a circle spaced outwardly from the peripheral edge of the opening therein to leave an annular ledge 62 surrounding the opening. The annular ledge 62 forms a support for an elongated, annular fluid treating material container 63. The container 63 is removably mounted within the frusto-conically shaped baffle member 61, with its bottom end resting on the ledge 62 and with its upper end extending through the opening in the upper disc 59.

The outlet pipe 35 is connected, as by welding, to the vessel 33 at a point above the upper annular disc 59 and the inlet pipe 36 is connected, as by welding, to the vessel 33 at a point below the lower annular disc 60, as shown in Fig. 16.

Figure 17:
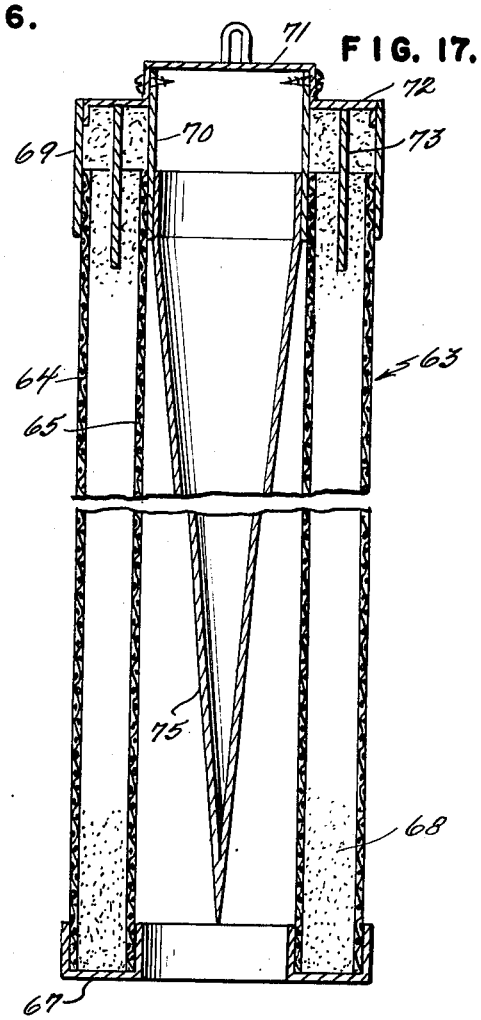
Fig. 17 is a vertical sectional view, with parts broken away, of the fluid treating material container shown in Fig. 15.
Figure 18:
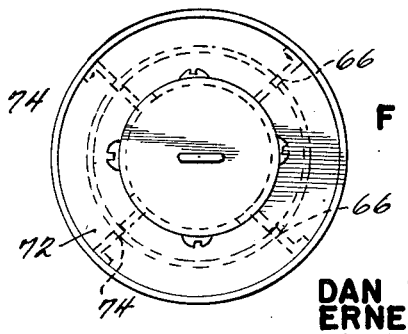
Fig. 18 is a plan view of the container shown in Fig. 15.

The containers 63 are identical in construction and, as shown in Figs. 17 and 18, each comprises two concentric tubular screens 64, 65 held in spaced-apart relation by a plurality of longitudinal radial fins 66, with the annular space between the screens closed at the bottom, as by a flanged annular plate 67. The mesh of the screens is such as to retain a granular fluid treating material 68 in the annular space between the screens. In the instant case, the fluid treating material 68 may be any adsorbent having characteristics substantially like silica gel or the gel of other activated hydrous oxides. Preferably, silica gel is used.

Each of the containers 63 is closed at its top by means of concentric hoops or metal bands 69, 70 mounted on the concentric screens 64, 65, and a cover plate 71 detachably connected to the inner hoop or band 70, as by screws, and having a depending annular flange 72 fitting between the hoops or bands 69, 70. A depending cylindrical fin 73 is secured to the flange 72 and projects downwardly between and below the hoops or bands 69, 70, and fits in slits 74 formed in the upper ends of the radial fins 66, all as shown in Figs. 17 and 18. The construction is such that, as the silica gel settles down, leaving a space between the top portion of the wire screens devoid of silica gel, the fin 73 will prevent fluid from passing through the space.

Mounted within the inner wire screen 65 is an inverted substantially conically shaped baffle member 75. The baffle member 75 is closed at its apex which extends downwardly to a point near the bottom of the container and has its upper peripheral edge suitably secured to the band 70, as by welding. Preferably, the baffle member 75 is made of thin sheet metal.

When the container 63 is mounted within the hollow member 61, as shown in Fig. 16, the elongated annular space between the walls of the member 61 and the inverted conical baffle member 75 forms an elongated frusto-conically shaped duct which is annular in cross section. The annular container, filled with silica gel, is positioned in the duct between the members 61 and 75 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow thereby creating a substantially constant static head over the face of the barrier, resulting in a substantially uniform distribution of the fluid throughout the entire barrier area. Thus, it will be seen that by using the baffle members 61 and 75, the entire barrier area is made use of with resultant increase in efficiency, capacity and economy.

Figure 15:
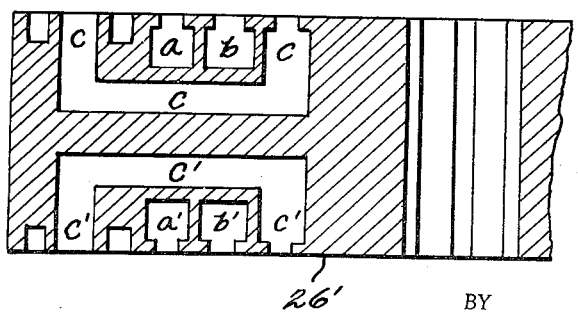
Fig. 15 is a vertical cross sectional view, taken on the line 15—15 of Fig. 13.
Figure 13:
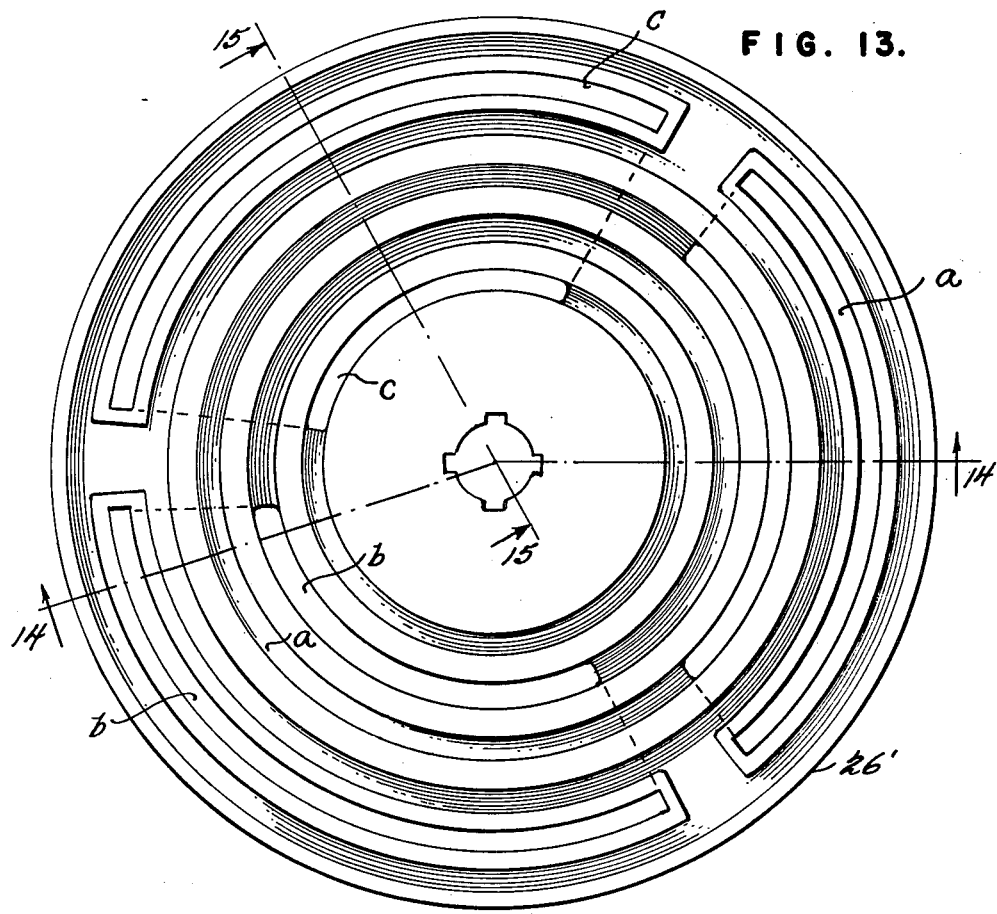
Fig. 13 is a plan view of a modified form of disc valve.
Figure 14:
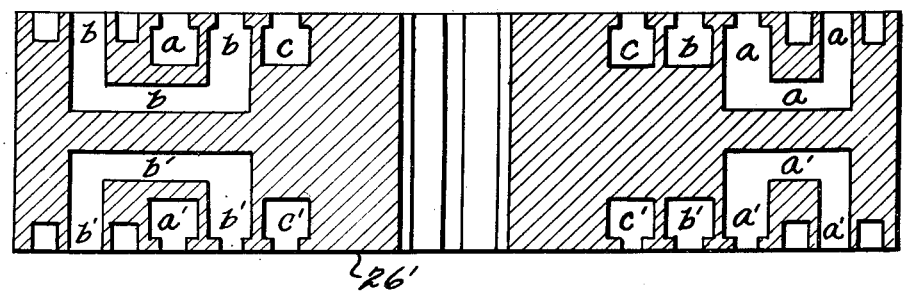
Fig. 14 is a vertical cross sectional view, taken on the line 14—14 of Fig. 13.

A modified form of the disc valve is shown in Figs. 13, 14 and 15. The modified disc valve 26' is identical in construction with the disc valve 26 above described, except for the arrangement of the ports a, a', b, b', c and c'. As shown in Figs. 13, 14 and 15, the annulus a, b and c in the upper surface of the disc valve are connected to the manifolds a, b and c in the upper surface of the disc valve by the ports a, b and c, respectively. The annulus a', b' and c' formed in the bottom surface of the disc valve are connected to the manifolds a', b' and c' in the bottom surface of the disc valve by the ports a', b' and c', respectively.

The manner in which the apparatus of the present invention may be employed to remove water vapor and condensable hydrocarbons from wet natural gas, as well as the auxiliary apparatus required, is schematically shown in Fig. 18. The description of the various flows of fluids through the valve disc will be described as flowing through the valve disc 26, illustrated in Figs. 4 and 7 to 12, inclusive.

As there shown, the wet natural gas from which moisture and condensable hydrocarbons are to be removed, is supplied under high pressure by pipe line 76 and enters the upper end of the distribution chamber 20 of the fluid treating apparatus through inlet conduit 28 and passes through inlet opening a in the tube sheet disc 40 into the annular channel or annulus a formed in the upper surface of the valve disc 26. From the annulus a the gas passes through port a into manifold a' formed in the bottom surface of the valve disc 26. From manifold a' the gas passes through openings 38 formed in the tube sheet disc 37 and inlet pipe 35 into the lower end portions of the group of pressure vessels 33 which are at that time in communication with the manifold a'. The gas passes upwardly through the vessels 33 and through the silica gel beds therein into the tops of the vessels. The baffle members 61 and 75 within the vessels 33 insure a substantially uniform flow and distribution of the wet gas through the silica gel beds which adsorb some of the moisture content from the gas. From the tops of the vessels 33 the now partially dried gas passes through outlet pipes 36 and openings 41 in the tube sheet disc 40 in the distribution chamber into manifold a formed in the upper surface of the valve disc 26. From manifold a the gas passes through port a' into the channel or annulus a' formed in the bottom surface of the valve disc 26 and thence through opening a' in the tube sheet disc 37 into the outlet conduit 31.

From the outlet conduit 31, the partially dried gas passes through pipe line 77 into an intercooler 78, where it is cooled. The intercooler 78 may be of the water circulating type. From the intercooler, the gas passes through pipe line 79, inlet conduit 27, and inlet opening b in the tube sheet disc 40 of the distribution chamber 20, into the annular channel or annulus b in the upper face of the valve disc 26. From the annulus b the gas passes through port b into manifold b' in the bottom of the valve disc 26. From the manifold b' the gas passes through openings 38 formed in the disc 37 and inlet pipes 35 into the lower end portions of the group of pressure vessels 33 which are at that time in communication with manifold b'. The gas passes upwardly through the pressure vessels 33 of the second group and through the silica gel beds therein into the tops thereof. The remainder of the moisture content of the gas being adsorbed during its passage through the silica gel beds.

From the tops of the vessels 33 of the second group the now dried gas passes through outlet pipes 36 and openings 41 in the tube sheet disc 40 in the distribution chamber into manifold *b* in the upper surface of the disc valve 26. From the manifold *b* the gas passes through port *b'* into the annular channel or annulus *b'* formed in the bottom surface of the valve disc 26 and thence through outlet opening *b'* in the tube sheet disc 37 into the outlet conduit 32, and from thence to the various points of use.

A portion of the incoming wet gas is diverted from the supply line 76, by means of a pipe line 80, through a heater 81, where its temperature is raised to from 300° F. to 600° F., depending upon its moisture content and the type of hydrocarbons to be recovered. From the heater 81, the heated gas passes through pipe line 82, inlet conduit 30, and inlet opening *c'* in the tube sheet disc 37 of the distribution chamber 20, into annular channel or annulus *c'* in the lower surface of the valve disc 26. From the annulus *c'* the heated gas passes through port *c'* into manifold *c* in the top of the valve disc 26. From the manifold *c* the gas passes through openings 41 formed in the tube sheet disc 40 and pipes 36 into the upper end portions of the group of pressure vessels 33 which are at that time in communication with the manifold *c*. The heated gas passes downwardly through the pressure vessels of the third group and through the silica gel beds therein into the bottoms of the vessels. As the heated gas passes through the silica gel beds it removes the moisture and hydrocarbons therefrom. From the bottoms of the vessels 33 of the third group, the hot, moisture and hydrocarbon laden gas passes through pipes 35 and openings 38 in the tube sheet disc 37 of the distribution chamber 20 into manifold *c'* in the lower surface of the valve disc 26. From the manifold *c'* the gaseous mixture passes through port *c* into the annular channel or annulus *c* formed in the top surface of the valve disc 26 and thence through outlet opening *c* in the tube sheet disc 40 into the outlet conduit 29 and from there through pipe line 83 into condenser 84, where the moisture and hydrocarbons are condensed. The now cooled gas, with the condensate, pass from the condenser 84 through pipe line 85 to the separator 86, where the condensate is separated from the gas. The water and hydrocarbons are drained from the bottom of the separator by means of a drain line 87.

From the separator 86, the gas passes through pipe line 88 back into the supply line 76, where it is mixed with the incoming gas on the way to the first passage through the apparatus.

When the modified form of the disc valve 26', as illustrated in Figs. 13 to 15, inclusive, is employed in the apparatus, the flows of the various fluids through the disc valve 26' and the auxiliary apparatus schematically shown in Fig. 19, are as follows:

The wet natural gas from which moisture and condensable hydrocarbons are to be removed, is supplied under high pressure by pipe line 76 and enters the upper end of the distribution chamber 20 of the fluid treating apparatus through inlet conduit 28 and passes through inlet opening *a* in the tube sheet disc 40 into the annular channel or annulus *a* formed in the upper surface of the valve disc 26'. From the annulus *a* the gas passes through port *a* into manifold *a* formed in the upper surface of the valve disc 26'. From manifold *a*, the gas passes through openings 41 formed in the upper tube sheet disc 40 and inlet-outlet pipes 36 into the upper end portions of the group of pressure vessels 33 which are at that time in communication with the manifold *a*. The gas passes downwardly through the vessels 33 and through the silica gel beds therein into the bottom of the vessels. The baffle members 61 and 75 within the vessels 33 insure a substantially uniform flow and distribution of the wet gas through the silica gel beds which adsorb some of the moisture content from the gas. From the bottoms of the vessels 33 the now partially dried gas passes through inlet-outlet pipes 35 and openings 38 in the lower tube sheet disc 37 in the distribution chamber into manifold *a'* formed in the lower surface of the valve disc 26'. From manifold *a'* the gas passes through port *a'*, into the channel or annulus *a'* formed in the bottom surface of the valve disc 26' and thence through opening *a'* in the tube sheet disc 37 into the outlet conduit 31.

From the outlet conduit 31, the partially dried gas passes through pipe line 77 into the intercooler 78, where it is cooled. From the intercooler, the gas passes through pipe line 79, inlet conduit 27, and inlet opening *b* in the tube sheet disc 40 of the distribution chamber 20, into the annular channel or annulus *b* in the upper face of the valve disc 26'. From the annulus *b* the gas passes through port *b* into manifold *b* in the top of the valve disc 26'. From the manifold *b* the gas passes through openings 41 formed in the upper tube sheet disc 40 and inlet pipes 36 into the upper end portions of the group of pressure vessels 33 which are at that time in communication with manifold *b*. The gas passes downwardly through the pressure vessels 33 of the second group and through the silica gel beds therein into the bottoms thereof the remainder of the moisture content of the gas being adsorbed during its passage through the silica gel beds.

From the bottom of the vessels 33 of the second group the now dried gas passes through inlet-outlet pipes 35 and openings 38 in the long tube sheet disc 37 in the distribution chamber into manifold *b'* in the bottom surface of the disc valve 26'. From the manifold *b'* the gas passes through port *b'* into the annular channel or annulus *b'* formed in the bottom surface of the valve disc 26' and thence through outlet opening *b'* in the tube sheet disc 37 into the outlet conduit 32, and from thence to the various points of use.

A portion of the incoming wet gas is diverted from the supply line 76, by means of a pipe line 80, through a heater 81, where its temperature is raised to from 300° F. to 600° F. From the heater 81, the heated gas passes through pipe lines 82, inlet conduit 30, and inlet opening *c'* in the tube sheet disc valve 37 of the distribution chamber 20, into annular channel or annulus *c'* in the lower surface of the valve disc 26'. From the annulus *c'* the heated gas passes through port *c'* into manifold *c'* in the bottom of the valve disc 26'. From the manifold *c'* the gas passes through openings 38 formed in the lower tube sheet disc 37 and inlet-outlet pipes 35 into the lower end portions of the group of pressure vessels 33 which are at that time in communication with the manifold *c'*. The heated gas passes upwardly through the pressure vessels of the third group and through the silica gel beds therein into the bottoms of the vessels. As the heated gas passes through the silica gel beds it removes the moisture and hydrocarbons therefrom. From the tops of the vessels 33 of the third group, the hot, moisture and hydrocarbon laden gas passes through inlet-outlet pipes 36 and openings 41 in the upper tube sheet disc 40 of the distribution chamber 20 into manifold *c* in the upper surface of the valve disc 26'. From the manifold *c* the gaseous mixture passes through port *c* into the annular channel or annulus *c* formed in the top surface of the valve disc 26' and thence through outlet opening *c* in the tube sheet disc 40 into the outlet conduit 29 and from there through pipe line 83 into condenser 84, where the moisture and hydrocarbons are condensed. The now cooled gas, with the condensate, pass from the condenser 84 through pipe line 85 to the separator 86, where the condensate is separated from the gas. The water and hydrocarbons are drained from the bottom of the separator by means of a drain line 87.

From the separator 86, the gas passes through pipe line 88 back into the supply line 76, where it is mixed with the incoming gas on the way to the first passage through the apparatus.

The gas being dehydrated makes two passages through groups of the silica gel containing pressure vessels, while the heated gas or reactivating medium makes a single passage through a group of the silica gel containing pressure vessels. For convenience in description, the pressure vessels which form the group through which the first dehydrating passage is made is called the first dehydration zone, the group through which the second dehydrating passage is made is called the second dehydrating zone, and the group through which the hot gas used for reactivation passes is called the reactivation zone.

Figure 2:
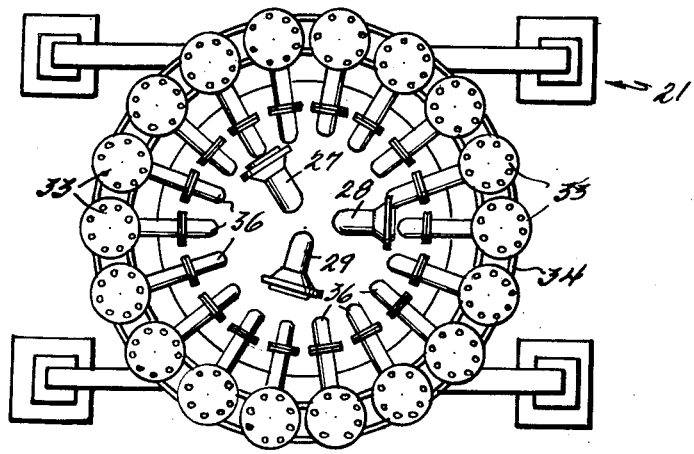
Fig. 2 is a plan view of the apparatus shown in Fig. 1.
Figure 3:
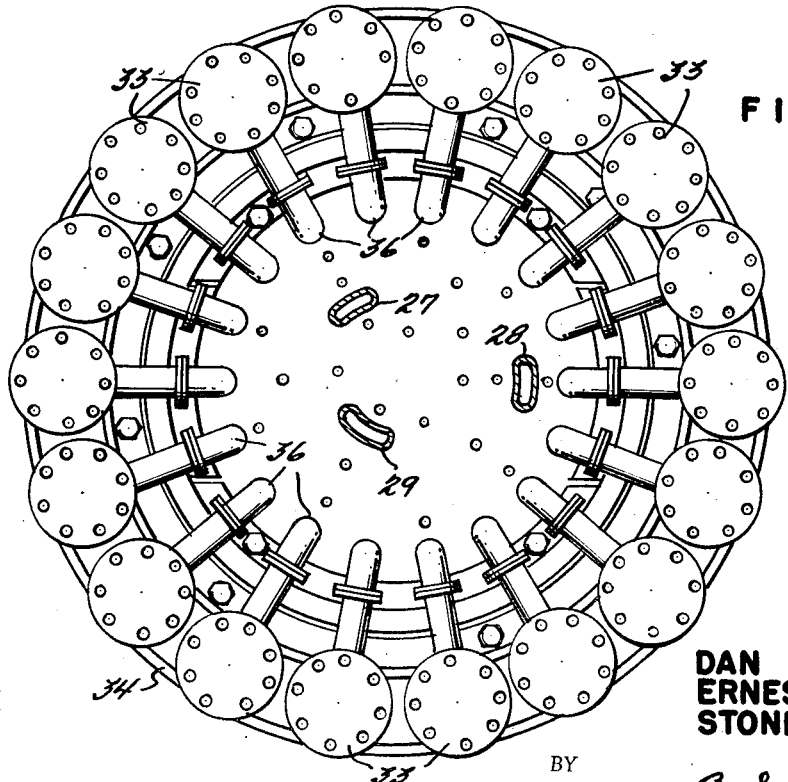
Fig. 3 is a plan view, on a larger scale, of the apparatus shown in Fig. 1; with the inlet conduits broken away.

In the particular embodiments of the invention illustrated, the disc valves are rotated counterclockwise, as viewed in Fig. 2, and at a rate of 1 revolution every 10 minutes; thus, it will be seen that, as the disc valves rotate, each of the three groups of pressure vessels 33 will be successively brought into communication with the manifolds $a$, $a'$, $b$, $b'$, $c$ and $c'$ in the distribution chamber, so that each group will, in turn, become a second dehydration zone, a first dehydration zone, and an activation zone.

From the foregoing, it readily will be seen that there has been provided novel apparatus for treating fluids, either liquid or gaseous; one that is particularly adapted to treat such fluids while under high pressure; and one which provides for one or more passages of the fluid being treated through the apparatus.

Obviously, the flows of fluid through the fluid treating pressure vessels 33 may be in either direction, i. e., top to bottom or bottom to top.

Obviously, too, the present invention is not restricted to the particular embodiments thereof herein shown and described. Moreover, it is not indispensable that all of the features of the invention be used conjointly, since they may be advantageously employed in various combinations and sub-combinations.

What is claimed is:

1. Apparatus for treating fluids comprising a plurality of closed vessels adapted to contain fluid treating material, a hollow cylindrical distribution chamber having closed top, bottom and side walls, said chamber having a circular row of circular openings formed in its upper portion, a circular row of circular openings formed in its lower portion, at least two conduits connected to its upper portion, and at least two conduits connected to its lower portion; a pipe connecting one end portion of each of said closed vessels with one of said circular openings in the upper portion of said chamber and a pipe connecting the other end portion of each of said closed vessels with one of said circular openings in the lower portion of said chamber; valve means mounted in said distribution chamber for rotation about the longitudinal axis thereof, said valve means including at least four annular-trough-shaped conduits, each having its closed bottom side extending inwardly with respect to said chamber and its open outer side in communication with one of the conduits connected to said chamber and with the outer ends of its walls in sealing engagement with the wall of the chamber to which the conduit is connected; at least two circumferentially spaced, arc-shaped and trough-shaped closed end conduits, each having its closed bottom side extending inwardly with respect to said chamber and its open outer side positioned to communicate with a group of the circular openings in the upper portion of the distribution chamber and with the outer ends of its side and end walls in sealing engagement with the wall of the chamber in which the circular openings are formed; at least two circumferentially spaced, arc-shaped, trough-shaped closed end conduits, each having its closed bottom side extending inwardly with respect to said chamber and its open outer side positioned to communicate with a group of the circular openings in the lower portion of said distribution chamber and with the outer ends of its side and end walls in sealing engagement with the wall of the chamber in which the circular openings are formed; and at least four ports, each forming a passageway connecting one of the annular conduits with one of the arc-shaped conduits; the construction and arrangement being such that at least two separate, distinct and continuous flows of fluid may flow through the apparatus; and means for rotating the valve means so that the separate flows of fluid will be directed successively through the vessels containing fluid treating material.

2. Apparatus as set forth in claim 1, wherein said distribution chamber and said fluid treating material containing vessels are pressure vessels so that all of the flows of fluid through the apparatus may be made under high pressure.

3. Apparatus as set forth in claim 1, wherein each of said closed vessels is provided with a removable cover plate and wherein an elongated annular foraminous container adapted to hold fluid treating material is removably mounted in each of said closed vessels.

4. Apparatus for treating fluids comprising a plurality of closed vessels adapted to contain fluid treating material; a cylindrical distribution chamber having each end closed by a disc having a circular row of circular openings formed therein adjacent its outer periphery for the passage of fluids and at least two additional radially and circumferentially spaced fluid passing openings formed therein; a pipe connecting one end portion of each of said vessels with one of the circular openings in one of the discs of said distribution chamber and a pipe connecting the other end portion of each of said vessels with one of the circular openings in the other end disc of said distribution chamber; a disc valve rotatably mounted in said distribution chamber and having at least two annular recesses formed in its upper and lower surfaces and at least two circumferentially spaced arc-shaped recesses having equal radii formed in its upper and lower surfaces; and a plurality of ports therein, each forming a fluid passage connecting one of the annular recesses with one of the arc-shaped recesses, said disc valve being mounted in said distribution chamber with each of its annular recesses in communication with one of the openings in the adjacent end disc and with each of its arc-shaped recesses in communication with a group of the circular openings in the adjacent end disc; the construction and arrangement being such that at least two separate, distinct and continuous flows of fluid may flow through the apparatus; and means for rotating said disc valve so that the separate flows of fluid will be directed successively through the vessels containing fluid treating material.

5. Apparatus for treating fluids, as set forth in claim 4, wherein each of the annular recesses and each of the arc-shaped recesses formed in the disc valve are sealed off from each other and the space within the distribution chamber by seals.

6. Apparatus for treating fluids, as set forth in claim 5, wherein the distribution chamber and fluid treating material containing vessels are pressure vessels so that all of the flows of fluids through the apparatus may be made under high pressure.

7. Apparatus as set forth in claim 4, wherein each of said closed vessels is provided with a removable cover plate and wherein an elongated annular foraminous container adapted to hold fluid treating material is removably mounted in each of said closed vessels.

8. Apparatus for removing moisture and condensable hydrocarbons from wet natural gas comprising a plurality of stationary closed vessels each containing a bed of silica gel; a cylindrical distribution chamber having each end closed by a closure disc having three radially and circumferentially spaced openings formed therein for the passage of fluids and also having a circular row of circular openings formed therein for the passage of fluids, a pipe connecting one end portion of each of said vessels with one of the circular openings in one of the closure discs of the distribution chamber and a pipe connecting the other end portion of each of said vessels with one of the circular openings in the other closure disc of the distribution chamber; a disc valve rotatably mounted in said distribution chamber, said disc valve having three annular recesses formed in its upper and lower surfaces, three circumferentially spaced arc-shaped recesses having equal radii formed in its upper and lower surfaces, and a plurality of ports therein, each forming a fluid passage connecting one of the annular recesses with one of the arc-shaped recesses, said disc valve being mounted in said distribution chamber with each of its annular channels in communication with one of the openings in the adjacent closure disc and with each of its arc-shaped recesses in communication wtih a group of the circular openings in the adjacent closure disc; means including conduits for permitting a continuous flow of heated gas through a corresponding pair of manifolds in the disc valve in the said distribution chamber and the group of silica gel containing vessels in communication with the pair of manifolds; means including conduits for permitting a continuous flow of wet natural gas in succession through the second corresponding pair of manifolds and the group of silica gel containing vessels in communication therewith and the third corresponding pair of manifolds and the group of silica gel containing vessels in communication therewith; the construction and arrangement being such that the group of silica gel containing vessels through which the heated gas flows becomes an activation zone, the first group of silica gel containing vessels through which the natural gas flows becomes a first dehydrating zone, and the second group of silica gel containing vessels through which the natural gas flows becomes a second dehydrating zone; and means for rotating said disc valve so that each group of silica gel containing vessels becomes in succession a second dehydrating zone, a first dehydrating zone and then an activation zone.

9. Apparatus for treating fluids, as set forth in claim 8, wherein each of the annular recesses and each of the arc-shaped recesses formed in the disc valve are sealed off from each other and the space within the distribution chamber by seals.

10. Apparatus for treating fluids, as set forth in claim 9, wherein the distribution chamber and fluid treating material containing vessels are pressure vessels so that all of the flows of fluids through the apparatus may be made under high pressure.

11. Apparatus as set forth in claim 8, wherein each of said closed vessels is provided with a removable cover plate and wherein an elongated annular foraminous container adapted to hold fluid treating material is removably mounted in each of said closed vessels.

12. Apparatus as set forth in claim 11, wherein baffle means are mounted in each of said closed vessels and so positioned relative to the foraminous fluid treating material containing vessels therein as to produce a substantially uniform flow of fluids through the silica gel container throughout the entire area.

References Cited in the file of this patent
UNITED STATES PATENTS

| | | |
|---|---|---|
| 1,702,897 | Hartz | Feb. 19, 1929 |
| 1,965,461 | Gray | July 3, 1934 |
| 2,614,561 | Fox | Oct. 21, 1952 |
| 2,617,986 | Miller | Nov. 11, 1952 |